(12) United States Patent
Gallagher et al.

(10) Patent No.: US 11,059,736 B2
(45) Date of Patent: *Jul. 13, 2021

(54) LAMINATED AND ION-EXCHANGED STRENGTHENED GLASS LAMINATES

(71) Applicant: CORNING INCORPORATED, Corning, NY (US)

(72) Inventors: Michael Thomas Gallagher, Painted Post, NY (US); Suresh Thakordas Gulati, Elmira, NY (US); Timothy James Kiczenski, Corning, NY (US); Robert Anthony Schaut, Painted Post, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/227,851

(22) Filed: Dec. 20, 2018

(65) Prior Publication Data

US 2019/0144322 A1     May 16, 2019

Related U.S. Application Data

(60) Continuation of application No. 15/354,143, filed on Nov. 17, 2016, now Pat. No. 10,196,295, which is a
(Continued)

(51) Int. Cl.
*C03B 17/02* (2006.01)
*B32B 17/06* (2006.01)
(Continued)

(52) U.S. Cl.
CPC ............. *C03B 17/02* (2013.01); *B32B 17/06* (2013.01); *C03B 17/025* (2013.01); *C03B 17/06* (2013.01);
(Continued)

(58) Field of Classification Search
None
See application file for complete search history.

(56) References Cited

U.S. PATENT DOCUMENTS

| | | | |
|---|---|---|---|
| 3,533,888 | A | 10/1970 | Eppler et al. |
| 3,582,454 | A | 6/1971 | Giffen |

(Continued)

FOREIGN PATENT DOCUMENTS

| | | | |
|---|---|---|---|
| CN | 101764467 A | | 6/2010 |
| CN | 103476727 B | | 4/2012 |

(Continued)

OTHER PUBLICATIONS

Borelli et al., "Glass Strengthening with an Ultrafast Laser", Laser Microprocessing Conference, pp. 185-189.
(Continued)

*Primary Examiner* — David Sample

(57) ABSTRACT

A method of making a glass sheet comprises laminating a high CTE core glass to a low CTE clad glass at high temperatures and allowing the laminate to cool creating compressive stress in the clad glass, and then ion exchanging the laminate to increase the compressive stress in the outer near surface regions of the clad glass. The core glass may include ions that exchange with ion in the clad glass to increase the compressive stress in inner surface regions of the clad glass adjacent to the clad glass/core glass interfaces. The glass laminate may be formed and laminated using a fusion forming and laminating process and fusion formable and ion exchangeable glass compositions.

16 Claims, 4 Drawing Sheets

Related U.S. Application Data division of application No. 14/232,425, filed as application No. PCT/US2012/047515 on Jul. 20, 2012, now Pat. No. 9,522,836.

(60) Provisional application No. 61/511,422, filed on Jul. 25, 2011.

(51) Int. Cl.

| | |
|---|---|
| C03B 17/06 | (2006.01) |
| C03B 23/20 | (2006.01) |
| C03B 29/02 | (2006.01) |
| C03C 21/00 | (2006.01) |
| C03C 3/085 | (2006.01) |
| C03C 3/087 | (2006.01) |
| C03C 3/091 | (2006.01) |
| C03C 3/093 | (2006.01) |
| C03C 4/18 | (2006.01) |

(52) U.S. Cl.
CPC ............ *C03B 17/064* (2013.01); *C03B 23/20* (2013.01); *C03B 29/025* (2013.01); *C03C 3/085* (2013.01); *C03C 3/087* (2013.01); *C03C 3/091* (2013.01); *C03C 3/093* (2013.01); *C03C 4/18* (2013.01); *C03C 21/002* (2013.01); *B32B 2307/30* (2013.01); *C03C 2204/00* (2013.01); *Y10T 428/24942* (2015.01); *Y10T 428/2933* (2015.01)

(56) References Cited

U.S. PATENT DOCUMENTS

| | | | |
|---|---|---|---|
| 3,597,305 A * | 8/1971 | Giffen | C03B 17/02 428/216 |
| 3,630,704 A | 12/1971 | Harmon et al. | |
| 3,673,049 A | 6/1972 | Giffen et al. | |
| 3,676,043 A | 7/1972 | Anderson et al. | |
| 3,737,294 A | 6/1973 | Dumbaugh, Jr. et al. | |
| 3,746,526 A | 7/1973 | Giffon | |
| 3,796,013 A | 3/1974 | Brown | |
| 3,798,013 A | 3/1974 | Inoue et al. | |
| 3,849,097 A | 11/1974 | Giffen et al. | |
| 3,857,689 A | 12/1974 | Koizumi et al. | |
| 3,931,438 A | 1/1976 | Beall et al. | |
| 3,958,052 A | 5/1976 | Galusha et al. | |
| 4,023,953 A | 5/1977 | Megles, Jr. et al. | |
| 4,102,664 A | 7/1978 | Dumbaugh, Jr. | |
| 4,180,758 A | 12/1979 | Notelteirs et al. | |
| 4,214,886 A | 7/1980 | Shay et al. | |
| 4,259,118 A | 3/1981 | Sack | |
| 4,457,771 A | 7/1984 | Ambrogi | |
| 5,342,426 A | 8/1994 | Dumbaugh, Jr. | |
| 5,559,060 A | 9/1996 | Dumbaugh, Jr. et al. | |
| 6,516,634 B1 | 2/2003 | Green et al. | |
| 6,844,669 B2 | 1/2005 | Sugawara et al. | |
| 7,201,965 B2 | 4/2007 | Gulati et al. | |
| 7,207,193 B2 | 4/2007 | Xun et al. | |
| 7,414,001 B2 | 8/2008 | Helfinstine et al. | |
| 7,430,080 B2 | 9/2008 | Cintz | |
| 7,430,880 B2 | 10/2008 | Butts et al. | |
| 7,514,149 B2 | 4/2009 | Bocko et al. | |
| 7,666,511 B2 | 2/2010 | Ellison et al. | |
| 7,681,414 B2 | 3/2010 | Pitbladdo | |
| 7,685,840 B2 | 3/2010 | Allaire et al. | |
| 7,818,980 B2 | 10/2010 | Burdette et al. | |
| 7,871,703 B2 | 1/2011 | Shelestak et al. | |
| 8,007,913 B2 | 8/2011 | Coppola et al. | |
| 8,075,999 B2 | 12/2011 | Barefoot et al. | |
| 8,211,505 B2 | 7/2012 | Bocko et al. | |
| 8,304,078 B2 | 11/2012 | Varshneya | |
| 8,312,739 B2 | 11/2012 | Lee et al. | |
| 8,321,739 B2 | 11/2012 | Huschke et al. | |
| 8,415,013 B2 | 4/2013 | Barefoot et al. | |
| 8,518,545 B2 | 8/2013 | Akiba et al. | |
| 8,561,429 B2 | 10/2013 | Allan et al. | |
| 8,642,175 B2 | 2/2014 | Hashimoto et al. | |
| 8,685,873 B2 | 4/2014 | Siebers et al. | |
| 8,813,520 B2 | 8/2014 | Hashimoto et al. | |
| 8,916,487 B2 | 12/2014 | Kawai et al. | |
| 9,302,937 B2 | 4/2016 | Gulati et al. | |
| 9,422,188 B2 | 8/2016 | Garner et al. | |
| 9,957,190 B2 | 5/2018 | Finkeldey et al. | |
| 10,196,295 B2 * | 2/2019 | Gulati | C03B 17/064 |
| 2004/0197575 A1 | 10/2004 | Bocko et al. | |
| 2005/0083058 A1 | 4/2005 | Itoh et al. | |
| 2006/0127679 A1 | 6/2006 | Gulati et al. | |
| 2007/0190340 A1 | 8/2007 | Coppola et al. | |
| 2009/0202808 A1 | 8/2009 | Glaesemann et al. | |
| 2009/0217705 A1 | 9/2009 | Filippov et al. | |
| 2009/0220761 A1 | 9/2009 | Dejneka et al. | |
| 2010/0000259 A1 | 1/2010 | Ukrainczyk et al. | |
| 2010/0009154 A1 | 1/2010 | Allan et al. | |
| 2010/0029460 A1 | 2/2010 | Shojiya et al. | |
| 2010/0035038 A1 | 2/2010 | Barefoot et al. | |
| 2010/0084016 A1 | 4/2010 | Aitken et al. | |
| 2010/0129944 A1 | 5/2010 | Shimada et al. | |
| 2011/0017297 A1 | 1/2011 | Aitken et al. | |
| 2011/0019123 A1 | 1/2011 | Prest et al. | |
| 2011/0067447 A1 | 3/2011 | Zadesky et al. | |
| 2011/0200805 A1 | 8/2011 | Tomamoto et al. | |
| 2011/0281093 A1 | 11/2011 | Gulati et al. | |
| 2011/0294648 A1 | 12/2011 | Chapman et al. | |
| 2011/0312483 A1 | 12/2011 | Nakashima et al. | |
| 2011/0318555 A1 | 12/2011 | Bookbinder et al. | |
| 2012/0040146 A1 | 2/2012 | Garner et al. | |
| 2012/0194974 A1 | 8/2012 | Weber et al. | |
| 2012/0208028 A1 | 8/2012 | Hashimoto et al. | |
| 2012/0216569 A1 | 8/2012 | Allan et al. | |
| 2012/0219792 A1 | 8/2012 | Yamamoto et al. | |
| 2012/0236477 A1 | 9/2012 | Weber | |
| 2012/0236526 A1 | 9/2012 | Weber | |
| 2013/0063885 A1 | 3/2013 | Shedletsky et al. | |
| 2013/0224492 A1 | 8/2013 | Bookbinder et al. | |
| 2013/0236666 A1 | 9/2013 | Bookbinder et al. | |
| 2014/0109616 A1 | 4/2014 | Varshneya | |
| 2014/0139978 A1 | 5/2014 | Kwong | |
| 2014/0141217 A1 | 5/2014 | Gulati et al. | |
| 2014/0174131 A1 | 6/2014 | Saito et al. | |
| 2014/0227524 A1 | 8/2014 | Ellison et al. | |
| 2014/0370264 A1 | 12/2014 | Ohara et al. | |
| 2015/0030816 A1 | 1/2015 | Uemura et al. | |
| 2015/0030827 A1 | 1/2015 | Gomez et al. | |
| 2015/0037552 A1 | 2/2015 | Mauro et al. | |
| 2015/0251383 A1 | 9/2015 | Beall et al. | |
| 2017/0141217 A1 | 5/2017 | Shirakawa et al. | |

FOREIGN PATENT DOCUMENTS

| | | |
|---|---|---|
| CN | 102791646 A | 11/2012 |
| CN | 103702952 A | 4/2014 |
| EP | 1376647 A2 | 2/2004 |
| GB | 1157898 | 7/1969 |
| JP | 59-139005 A | 8/1984 |
| JP | 2011-148683 A | 8/2011 |
| JP | 2011-527661 | 11/2011 |
| JP | 2013028512 A | 2/2013 |
| JP | 2013-518800 A | 5/2013 |
| JP | 2014-500847 A | 1/2014 |
| JP | 2014-521582 A | 8/2014 |
| JP | 2015-006959 A | 1/2015 |
| JP | 2015-511573 A | 4/2015 |
| KR | 10-2009-0027259 A | 3/2009 |
| KR | 2012026098 A | 3/2012 |
| KR | 2013135834 A | 12/2013 |
| TW | 201228970 A | 7/2012 |
| TW | 201304951 A | 2/2013 |
| TW | 201326060 A | 7/2013 |
| WO | 2004055837 A1 | 7/2004 |
| WO | 2004094321 A2 | 11/2004 |
| WO | 2011041484 A1 | 4/2011 |
| WO | 2011/065293 A1 | 6/2011 |
| WO | 2011/097314 A2 | 8/2011 |

(56) References Cited

FOREIGN PATENT DOCUMENTS

| | | |
|---|---|---|
| WO | 2011103798 A1 | 9/2011 |
| WO | 2012001914 A1 | 1/2012 |
| WO | 2012026098 A1 | 3/2012 |
| WO | 2012074983 A1 | 6/2012 |
| WO | 2012125857 A1 | 9/2012 |
| WO | 2013016157 A1 | 1/2013 |
| WO | 2013065648 A1 | 5/2013 |
| WO | 2013088856 A1 | 6/2013 |
| WO | 2013116420 A1 | 8/2013 |
| WO | 2013154034 A1 | 10/2013 |
| WO | 2014030738 A1 | 2/2014 |
| WO | 2014/055837 A2 | 4/2014 |

OTHER PUBLICATIONS

Chinese Office Action, dated May 21, 2015, pp. 1-12, Chinese Application No. 201280036592.1, The State Intellectual Property Office of The People's Republic of China, China.

Clasen, Preparation and Sintering of High-Density Green Bodies to High-Purity Silica Glasses, Jun. 11, 1986, pp. 335-343, Journal of Non-Crystalline Solids 89, Amsterdam.

Communication pursuant to Article 94(3) EPC, dated May 2, 2015, pp. 1-5, European Application No. 12741439.9-1355, The European Patent Office, The Netherlands.

Eagan et al., "Bubble Formation in Glass by Reaction With Si and Si—Ge Alloys", Journal of the American Ceramic Society, 1975, vol. 58, pp. 300-301.

English Translation of TW101123090 Office Action dated Jul. 21, 2016, 5 Pages.

EP12741439.9 Office Action dated Jun. 24, 2016, European Patent Office.

EP12741439.9 Office Action dated Feb. 5, 2015, European Patent Office.

Fillery, "Ion-Exchanged Glass Laminates that Exhibit a Threshold Strength," Aug. 2007, pp. 2502-2509, J. Am. Ceram. Soc. 90, Santa Barbara, California USA.

Fluegel, Thermal Expansion Calculation for Silicate Glasses at 210°C based on a Systematic Analysis of Global Databases, Oct. 2010, pp. 191-201, Glass Technology: European Journal of Glass Science and Technology Part A vol. 51, No. 5, Richland, Washington USA.

Giordano, et al. Glass transition temperatures of natural hydrous melts: a relationship with shear viscosity and implications for the welding process, Oct. 22, 2003, pp. 105-118, Journal of Volcanology and Geothermal Research 142, Munich, Germany.

Gy, Rene; "Ion Exchange for Glass Strengthening; Nov. 2007; Materials Science & Engineering"; vol. 149, pp. 159-165.

International Search Report and Written Opinion of the International Searchign Authority; PCT/US2012/047515; dated Oct. 19, 2012.

JP2014522897 Office Action dated Jun. 21, 2016.

Lange, et al., "Heat capacities of Fe2O3-bearing silicate liquids", 1992, pp. 311-320, Contrib Mineral Petrol, Princeton, NY USA.

Lapp, "AMLCD Substrates Trends in Technology", Corning Technical Information Paper, Nov. 2004, pp. 1-5.

Richet, et al., "Energetics of water dissolution in trachyte glasses and liquids", May 25, 2004, pp. 5151-5158, Geochimica et Cosmochimica Acta, vol. 68, No. 24., Easton, PA USA.

Richet, et al., "Water and the density of silicate glasses", Nov. 5, 1999, pp. 337-347, Contrib Mineral Petrol, Urbana, IL USA.

Rivers, et al., "Ultrasonic Studies of Silicate Melts," Aug. 10, 1987, pp. 9247-9270, Journal of Geophysical Research, vol. 92, Berkeley, California USA.

TW101123090 Search Report dated Nov. 26, 2015.

Ussler, et al., Phase equilibria along a basalt-rhyolite mixing line: implications for the origin of calc-alkaline intermediate magma, 1989, pp. 232-244, Contrib Mineral Petrol, Chapel Hill, NC USA.

Whittington, The viscosity of hydrous phonolites and trachytes, Feb. 9, 2000, pp. 209-233, Chemical Geology 174, Hannover, Germany.

European Office Action, dated Jun. 24, 2016, pp. 1-5, European Patent Application No. 12741439.9-1375, European Patent Office, The Netherlands.

International Search Report and Written Opinion PCT/US2016/056532 dated Nov. 20, 2017.

International Search Report and Written Opinion, dated Dec. 3, 2013, pp. 1-10, International Patent Application No. PCT/US2013/028093, European Patent Office, The Netherlands.

Official Letter (English summary), dated Dec. 2, 2015, pp. 1-3, Taiwan Patent Application No. 101123090, Taiwan Intellectual Property Office, Taiwan.

R. Clasen; "Preparation and Sintering of High-Density Green Bodies to High-Purity Silica Glasses"; Journal of Non-Crystalline Solids 89 (1987); pp. 335-344.

\* cited by examiner

LAMINATED AND ION-EXCHANGED STRENGTHENED GLASS LAMINATES

CROSS-REFERENCE TO RELATED APPLICATIONS

This application is a continuation of U.S. application Ser. No. 15/354,143, filed on Nov. 17, 2016, which is a divisional of U.S. application Ser. No. 14/232,425, filed on Jan. 13, 2014, now U.S. Pat. No. 9,522,836, which claims the benefit of priority under 35 U.S.C. § 371 of International Application No. PCT/US2012/047515, filed on Jul. 20, 2012, which claims the benefit of priority under 35 U.S.C. § 119 of U.S. Provisional Application Ser. No. 61/511,422, filed on Jul. 25, 2011, the entire content of each of which is hereby incorporated by reference.

BACKGROUND

Field

The disclosure relates generally to ion exchanged thin glass laminates, and more particularly ion exchanged thin glass laminates having a low coefficient of thermal expansion (CTE) ion-exchanged glass outer clad glass layer(s) laminated onto a high CTE glass inner core glass layer for creating compressive stresses in the outer clad glass layer(s), and more particularly to such laminates that have been strengthened via ion exchange, and more particularly to glass fusion forming and laminating processes and glass compositions for making such laminates, which may be used in automotive, aviation, architectural, appliance, display, touch panel, and other applications where a thin, strong, scratch resistant glass product is advantageous.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Various processes may be used to strengthen glass articles, including chemical tempering, thermal tempering, and lamination. Lamination mechanical glass strengthening is the primary mechanism that is responsible for the strength of Corelle® dinnerware, for example, that enables the dinnerware to withstand repeated damage from cutlery and general handling. Such dinnerware is made by thermally bonding or laminating three layers of glass, namely a glass core or center layer having a relatively high coefficient of thermal expansion (CTE) surrounded by two outer clad or skin layers having a relatively low CTE. Upon cooling of the laminate following thermal bonding of the clad glass layers to the outer surfaces of the core glass layer, the relatively high CTE of the core glass layer (compared to the CTE of the clad glass layers) causes the core glass layer to contract or shrink more than the clad glass layers. This causes the core glass layer to be in a state of tension and the clad glass layers to be in state of compression. The compressive stresses in the clad glass layers inhibit fracture formation and fracture propagation in the clad glass layers, thereby strengthening the glass laminate compared to clad glass that is not under compressive stresses. The laminate may also be thermally tempered to increase the compressive stress in the clad glass. The stress profile in such a mechanically strengthened glass laminate is schematically illustrated by the solid line A in FIG. 1. FIG. 1 plots the level of stress in the glass laminate (compressive stress − and tensile stress +) at different depths along the thickness of the glass laminate. The right and left sides in FIG. 1 correspond to the opposing outer surfaces of the glass laminate. The area designated by arrows 1 in FIG. 1 represents the core glass layer, and the areas designated by 2 arrows represent the clad glass layers. As can be seen in FIG. 1, the core glass is in a state of tensile stresses and the clad glass is in a state of compressive stresses.

Ion-exchange chemical strengthening is used by, for example, Corning Incorporated to strengthen Corning® Gorilla® glass. Gorilla glass is currently used as a cover glass for displays and touch screens in electronic devices such as smart phones, tablet computers and televisions. An example of an ion-exchange process is provided by U.S. patent Ser. No. 12/537,393, entitled STRENGTHENED GLASS ARTICLES AND METHODS OF MAKING, filed on Aug. 7, 2009, the disclosure of which is hereby incorporated by reference. In an ion exchange strengthening process, ions in the surface layer of the glass are replaced by, or exchanged with, larger ions in a bath solution (such as a salt bath) having the same valence or oxidation state. The glass being ion exchanged may be an aluminosilicate glass. Ions in the surface layer of the glass and the larger ions in the bath are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like. The stress profile of a glass sheet that has been chemically strengthened using an ion exchange process is illustrated by the dashed line B in the plot of FIG. 1. The area designated by arrows 3 in FIG. 1 represents a sheet of chemically strengthened glass. As can be seen in FIG. 1, the outer most or near surface portions of the glass sheet are in a state of compression and the central portion of the glass sheet is in a state of tension.

In both types of strengthened glass illustrated in FIG. 1, the compressive stress extends to a certain depth below the outer surface of glass, which depth is commonly referred to the depth of layer. The level of compressive stress in this outer most layer is commonly referred to as the compressive stress. Mechanical performance of strengthened glass is directly related to the shape of the stress profile, e.g. the depth of layer and the magnitude of the compressive stress present at a particular depth. The greater the depth of the compressive layer and the greater the compressive stress in the glass, then the stronger and more fracture resistant and fracture propagation resistant the glass will be. A high compressive stress in the near surface regions of ion exchanged chemically strengthened glass product inhibits fracture formation in the surface of the glass (providing scratch resistance) and inhibits fracture propagation from any fractures defects that exist or are created in the surface of the glass. Once a fracture propagates all the way through the near surface region of the glass that is under compressive stress (i.e. through the depth of layer) and the tip of the crack reaches the inner portion of the glass sheet or laminate that is under tension, then the crack quickly propagates through the glass resulting in a sudden failure and the glass product shatters.

Thin glasses, less than 2 mm thick, cannot be effectively tempered thermally. Such thin glasses must either be laminated to take advantage of expansion differential or they must be ion-exchanged to develop adequate levels of surface compression and depth of layer. Silicate glasses that can be laminated do not develop sufficient surface compressive stress due to limited amount of expansion differential between the clad glass and core glass. The most compressive stress that is theoretically possible by laminating silicate glasses is in a range from about 275 MPa to about 350 MPa with non-zero depth of layer. This level of compression is inadequate for some applications, i.e. for mitigating impact stresses in day to day use. Gorilla glass, for example, enjoys a surface compression approaching 800 MPa. Hence, laminated glass needs to be augmented with ion-exchange process to achieve surface compression approaching 800 MPa.

SUMMARY

This disclosure relates to the field of ion exchanged thin glass laminates, and more specifically to a glass laminate that combines two common glass strengthening techniques, mechanical lamination glass strengthening and chemical ion-exchange glass strengthening.

The present disclosure describes ion exchangeable and ion exchanged glasses suitable for lamination type mechanical strengthening as used to manufacture Corelle ware, that are also suitable for chemical ion exchange processes, including but not limited to chemical strengthening as used to manufacture Gorilla glass. By combing both lamination mechanical glass strengthening and ion exchange chemical glass strengthening in a single laminated glass, for example, superior mechanical performance can be obtained. A deep compressive layer from the mechanical CTE mismatch of the laminated glasses is coupled with an enhanced surface compressive stress from the chemical ion-exchange process. The resulting laminated glass has a higher combined compressive stress and/or depth of compressive stress layer than can be achieved using either ion exchange chemical glass strengthening or lamination mechanical glass strengthening alone. It is also possible to create a buried area of high compressive stress in the inner regions of the clad glass. Such a glass may be ideally suited for cover glass and other applications (e.g. TVs, handheld electronic devices, touch panels/displays, countertops, architectural, appliance, automotive, aviation, etc.) in which the glass is exposed to harsh conditions.

The present disclosure also describes ion exchangeable and ion exchanged glasses suitable for ion exchange of ions into the glass to impart a desired property to the glass, such, for example, as coloring, reflectivity, a higher or lower refractive index or CTE, strength, toughness, or anti-bacterial property, for example, silver ions may be exchanged into the outer surface of the clad glass to impart an anti-bacterial property to the surface of the clad glass.

More particularly, the present disclosure describes a low-CTE, ion-exchangeable clad glass composition and a high-CTE core glass composition. The present disclosure also describes such clad and core glass compositions that are suitable for fusion forming and laminating.

The present disclosure describes a process for adequately strengthening thin glass laminates for today's demanding applications.

The present disclosure describes a process for fusion forming and laminating, and ion exchanging thin glass laminates for today's demanding applications.

An embodiment hereof provides a process for making a strengthened laminated glass structure including the steps of draw forming a core glass having a first coefficient of thermal expansion (CTE) to form a core glass sheet; draw forming an ion exchangeable clad glass having a second CTE that is lower than the first CTE to form a clad glass sheet; laminating the core glass sheet to the clad glass sheet at temperature at or above the softening point of at least one of the core glass and the clad glass to form a laminated glass sheet; cooling the laminated glass sheet placing the core glass sheet in a state of tensile stress and placing the clad glass sheet in a state of compressive stress; and performing an ion exchange process on the laminated glass sheet to create a layer of compressive stress in an outer surface region of the clad glass in addition to the compressive stress created on the clad glass by the laminating and cooling steps.

According to embodiments hereof, the process may include the step of draw forming comprises forming a core glass sheet and forming two clad glass sheets; and the step of laminating comprises laminating one of the clad glass sheets to one surface of the core glass sheet and laminating the other of the clad glass sheets to the other surface of the core glass sheet.

The clad glass sheets may be wider than the core glass sheet, such that the edges of the clad glass sheets extend beyond the edges of the core glass sheet. The process may include deforming the edge portions of the clad glass sheets that extend beyond the edges of the core glass sheet toward each other and fusing the edge portions of the clad glass sheets together at the softening point of the clad glass or higher to encapsulate the edges of the core glass sheet.

According to embodiments hereof the core glass is ion exchangeable and contains high radius cations. The process may include exchanging the high radius cations in the core glass with smaller ions in the clad glass creating an area of enhanced compressive stress in an inner surface region of the clad glass. The high radius cations may be K ions.

Embodiments hereof provide a process wherein the step of exchanging the high radius cations with smaller ions in the clad glass is performed during one of the laminating step; the ion exchange step; and a separate heating step.

According to embodiments hereof the down draw forming steps may each comprise a fusion down draw step, a slot draw step.

An embodiment hereof includes forming the clad glass with an annular orifice to form a hollow clad glass tube and forming the core glass with an orifice to form a core glass cylinder.

Other embodiments hereof include forming a first clad glass tube with a first annular orifice, and a second clad glass tube with a second annular orifice; forming a core glass tube with a third annular orifice, wherein the first annular orifice and the first clad glass tube have an inner diameter that is about equal to an outer diameter of the third annular orifice and the core glass tube, and the second annular orifice and the second clad glass tube have an outer diameter that is about equal to an inner diameter of the third annular orifice, and the core glass tube; and the laminating step laminates the first clad tube to an outer peripheral surface of the core glass tube and laminates the second clad glass sheet to an inner peripheral surface of the core glass sheet. The laminating step may be performed in the draw.

Other embodiments hereof include a strengthened laminated glass structure, that includes a core glass layer having a first coefficient of thermal expansion (CTE); at least one ion exchangeable clad glass layer having a CTE that is lower than the CTE of the clad glass layer; wherein the clad glass layer is in a state of compressive stress, and an outer surface region of the clad glass layer is in a state of enhanced compressive stress.

In the previously described embodiments, the clad glass may have a CTE that is at least $10 \times 10^{-7}/°$ C. lower than the CTE of the core glass, a CTE that is lower than the CTE of the core glass by an amount in a range from about $10 \times 10^{-7}/°$ C. to about $70 \times 10^{-7}/°$ C., a CTE that is lower than the CTE of the core glass by an amount in a range from about $10 \times 10^{-7}/°$ C. to about $60 \times 10^{-7}/°$ C., or a CTE that is lower than the CTE of the core glass by an amount in a range from about $10 \times 10^{-7}/°$ C. to about $50 \times 10^{-7}/°$ C.

The glass laminate may have a total thickness not exceeding 3 mm, a total thickness in a range from about 0.15 mm to about 3 mm, a total thickness in a range from about 0.3 mm to about 3 mm.

The core glass may have a thickness of up to 2 mm.

According to one embodiment, a clad glass composition may include from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba and Zn. The glass composition generally has an average coefficient of thermal expansion of a glass formed from the glass composition is less than or equal to $55 \times 10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise. Due to the relatively low average coefficient of thermal expansion, the glass composition is particularly well suited for use as the glass cladding layers of a laminated glass article, such as a laminated glass article formed by a fusion lamination process.

According to embodiments hereof, the clad glass may be formed from a glass composition which may include from about 55 mol. % to about 70 mol. % $SiO_2$; from about 9 mol. % to about 14 mol. % $Al_2O_3$; and from about 0 mol. % to about 11 mol. % $B_2O_3$. The glass composition may further include from about 5 mol. % to less than 10 mol. % alkali oxide $R_2O$, wherein R is at least one of Li, Na, and K. The glass cladding layer may further include from about 3 mol. % to about 11 mol. % of divalent oxide MO, wherein M is at least one of Mg, Ca, Ba and Zn. The glass composition generally has an average coefficient of thermal expansion which is less than or equal to $55 \times 10^{-7}/°$ C. and is amenable to strengthening by ion-exchange.

Additional features and advantages of the glass compositions, lamination and chemical strengthening process, and resulting mechanically and chemically strengthened laminated glass articles will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
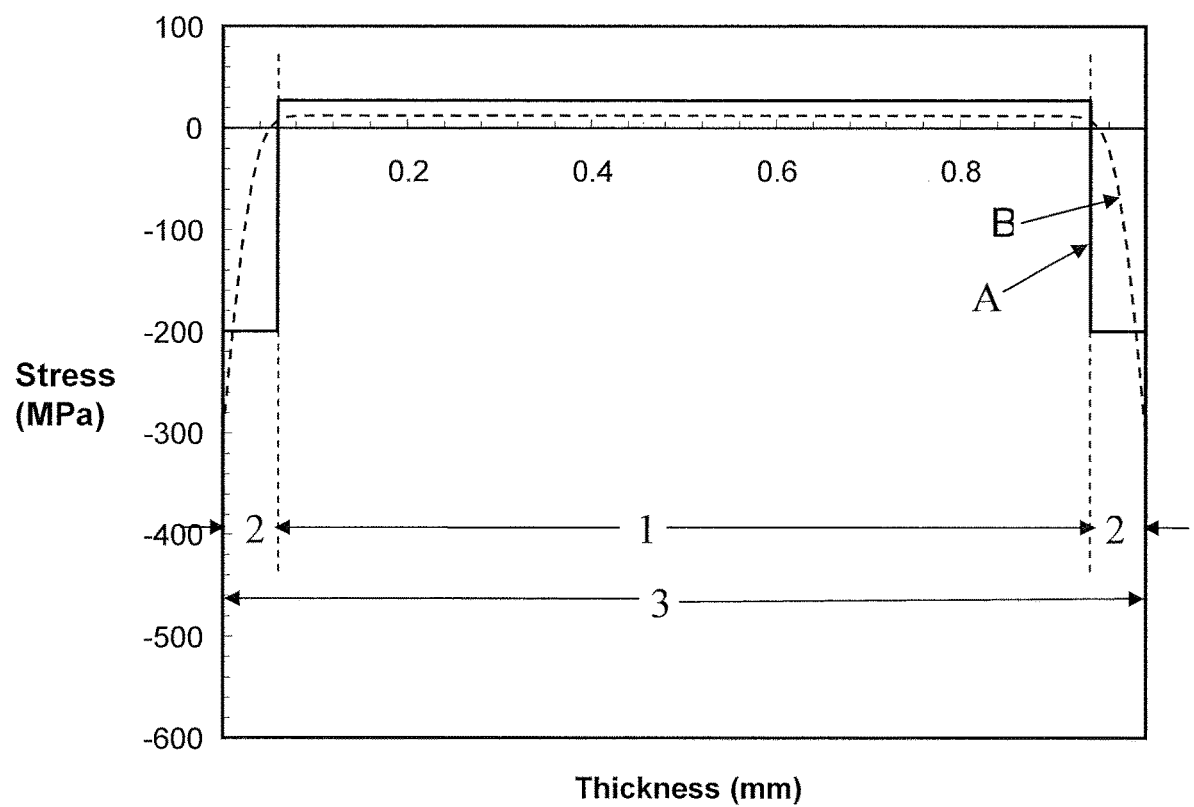
FIG. 1 is a plot illustrating the stress profile created in a glass laminate that has been strengthened using a lamination process and the stress profile in a glass sheet that has been chemically strengthened using an ion exchange process.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms that limit the invention to any particular orientation. Unless otherwise specified, a range of values, when recited, includes both the upper and lower limits of the range, as well as any subranges there between.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

The term relatively low or low CTE as used in relation to the clad glass in the present description and appended claims means a glass with a starting glass composition (e.g. prior to drawing, laminating and ion exchange) having a CTE that is lower than the CTE of the starting composition of the core glass by at least about $10 \times 10^{-7}/°$ C. The CTE of the clad glass may also be lower than the CTE of the core glass by an amount in a range from about $10 \times 10^{-7}/°$ C. to about $70 \times 10^{-7}/°$ C., from about $10 \times 10^{-7}/°$ C. to about $60 \times 10^{-7}/°$ C., or from about $10 \times 10^{-7}/°$ C. to about $50 \times 10^{-7}/°$ C. For example, the core glass may have a CTE of about $100 \times 10^{-7}/°$ C. and the clad glass may have a CTE of about $50 \times 10^{-7}/°$ C., such that there is a difference of about $50 \times 10^{-7}/°$ C. between the CTE of the core glass and the clad glass.

The term thin or relatively thin glass as used in relation to the glass laminate in the present description and appended claims is intended to mean a laminate having a total thickness not exceeding 3 mm, not exceeding 2.5 mm, in a range from about 0.1 mm to about 3.0 mm, from about 0.15 to about 3 mm, from about 0.3 mm to about 3 mm, from about 0.15 to about 2.5 mm, or from about 0.3 to about 2.5 mm (but in some instances the laminate may be over 3.0 mm thick). The core glass layers may have a thickness of up to about 2 mm, or up to about 1 mm (but is some instances may be greater than 2 mm), in a range from about 0.01 mm up to about 2 mm, from about 0.01 mm up to about 1 mm, from about 0.2 mm to about 2 mm from about 0.5 mm to about 0.75 mm, from about 0.9 mm to about 2 mm, from about 0.01 mm to about 1.5 mm from about 0.5 mm to about 2.5 mm, or from about 0.01 mm to about 0.5 mm.

The term mechanically strengthened glass laminate or mechanical strengthening as used in the present description and appended claims is intended to mean a glass laminate formed by laminating a high CTE core glass to a low CTE clad glass thereby creating compressive stresses in the clad glass when the laminate is cooled following lamination.

The terms "chemically strengthened" or "chemical strengthening" as used in the present description and appended claims is intended to mean glass that has been strengthened using an ion exchange process to create compressive stresses in the surface regions of the glass, whether it is a glass sheet, glass tube, or other specialty glass item.

Figure 2:
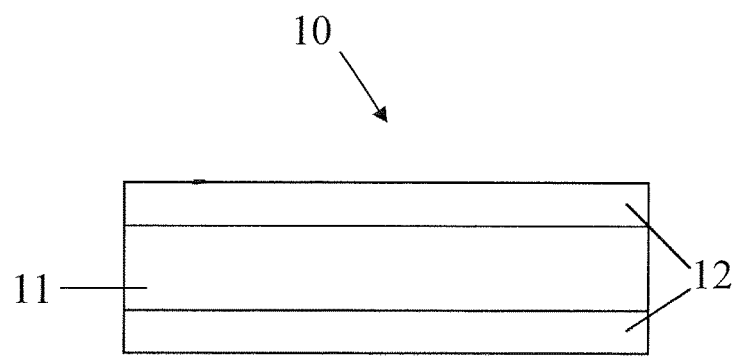
FIG. 2 is a schematic side view of a glass laminate according to embodiments hereof.
Figure 3:
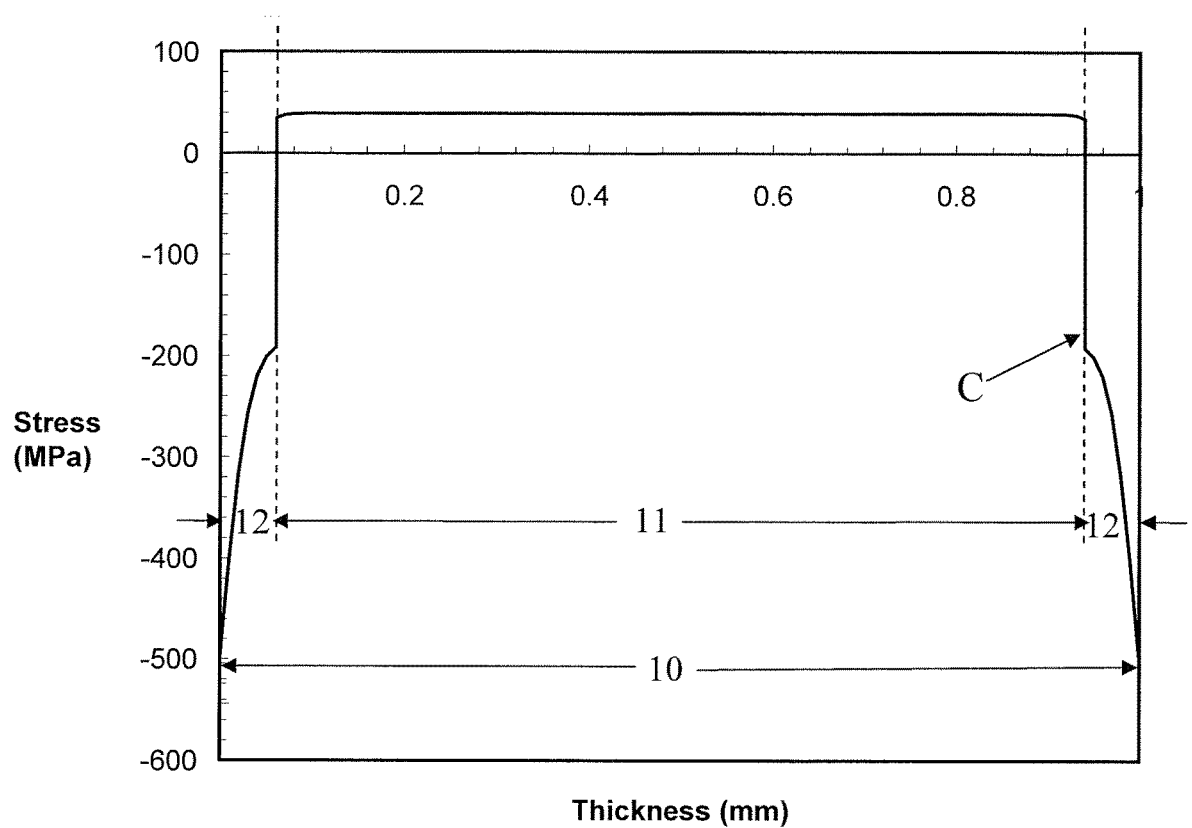
FIG. 3 is a plot illustrating the stress profile created in a glass laminate that has been strengthened using both a lamination strengthening process and an ion exchange strengthening process in accordance with embodiments hereof.

A glass laminate 10 according to embodiments hereof is schematically illustrated in FIG. 2, which is not drawn to scale. The glass laminate 10 includes a relatively high CTE core glass layer 11 and a relatively low CTE ion exchangeable clad glass layer 12 laminated to each surface of the core glass layer. As described in more detail hereinafter, the relatively low CTE clad glass layers are laminated to the relatively high CTE core glass layer by bonding the surfaces of the glass layers together at elevated temperatures such that the clad glass layers fuse to the core glass layers. The laminate is then allowed to cool. As the laminate cools, the relatively high CTE core glass layer 11 contracts more than the relatively low CTE clad glass layers 12 that are securely bonded to the surfaces of the core glass layer. Due to the variable contraction of the core glass layer and clad glass layers during cooling, the core glass layer is placed in a state of tension (or tensile stress) and the outer clad glass layers in a state of compression (or compressive stress). This results in a mechanically strengthened glass laminate having a stress profile similar to the stress profile as schematically illustrated by solid line A in FIG. 3, in which the compressive stress (or depth of compressive stress layer) extends entirely through the clad glass layers 12. An advantageous, very deep depth of the compressive layer (or simply depth of layer or DOL) is thus formed in the laminate 10. Compressive stresses (or simply CS) at the surface of the glass in a range from about 50 MPa to about 400 MPa or 700 MPa may be achievable using lamination type strengthening.

According to an alternative embodiment hereof, the clad glass layers 12 may extend beyond the edges of the core glass layer 11 and the edges of the clad glass layers may be bent into contact with each other and adhered or fused together (not shown). The edges of the core glass layer, which are in a state of tension, are encapsulated by the clad glass layers or layer, which are in a state of compression. Thus, the exposed surfaces of the laminate are all in a state of compression. Alternatively, one or more of the outer edges of the core glass layer 11 may extend beyond the corresponding outer edges of the clad glass layers 12, or the edges of the clad glass and the core glass layers may be coextensive.

The glass laminate 10 may then ion exchanged, as described in more detail hereinafter, in order to chemically strengthen the laminate by further increasing the compressive stress in the near surface regions of the ion exchangeable clad glass layers 12. The ion exchange chemical strengthening process generates a stress profile in the near surface regions of the clad glass layers 12 similar to the stress profile schematically illustrated by dashed line B in FIG. 1. The result is a glass laminate 10 having a stress profile as schematically illustrated by line C in FIG. 3 that is essentially the sum of the stress profile of line A in FIG. 1 and the stress profile of line B in FIG. 1. The compressive stress created at the outer surfaces and near surface regions of the clad glass layers are comparable to or greater than what can be achieved by ion exchange chemical strengthening alone, while maintaining compression at depth of layer as is achievable by lamination strengthening alone, but is not achievable by ion exchange chemical strengthening alone.

By combining both lamination mechanical glass strengthening and ion exchange chemical glass strengthening in a single laminated glass, the deep compressive stress layer obtained with the CTE mismatch of the laminated glasses is coupled with the high surface compressive stress obtained with the chemical ion-exchange process. The resulting laminated glass has a higher combined compressive stress (CS) and/or depth of compressive stress layer (DOL) than can be achieved using either ion exchange chemical strengthening or lamination glass strengthening alone, and superior mechanical performance can be obtained. The compressive stress at the outer surface of the clad glass layers from lamination may be over 50 MPa, over 250 MPa, in a range of from about 50 MPa to about 400 MPa, from about 50 MPa to about 300 MPa, from about 250 MPa to about 600 MPa, or from about 100 MPa to about 300 MPa. The compressive stress CS from ion exchange (if any) in the outer surface region of the clad glass layers may be 200 MPA or greater, 300 MPA or greater, 400 MPa or greater, 500 MPa or greater, 600 MPa or greater, 700 MPa or greater, 900 MPa or greater or in a range from 200 MPa to about 1000 MPA, from 200 MPa to about 800 MPA, with a resulting surface compression or compressive stress CS as high as 700 MPa to 1 GPa after ion exchange (i.e. 300 MPa from lamination and 700 MPa from ion exchange).

Such a glass may be ideally suited for cover glass and other applications (e.g. TVs, handheld electronic devices, touch panels/displays, countertops, architectural, appliance, automotive, aviation, signage, photovoltaic, aerospace, ballistic, safety, appliances, etc.) in which the glass is exposed to harsh conditions.

In certain embodiments hereof as previously described herein, the clad glass 22 is formed of a relatively low-CTE, ion-exchangeable glass compared to the core glass. If it is desired to ensure that the core glass layer is not appreciably ion exchangeable, then the composition the core glass may be adjusted accordingly, such as by adding latcher alkali ions to or removing aluminum from the core glass composition for example, as is well understood in the art of ion exchange glass strengthening.

Figure 4:
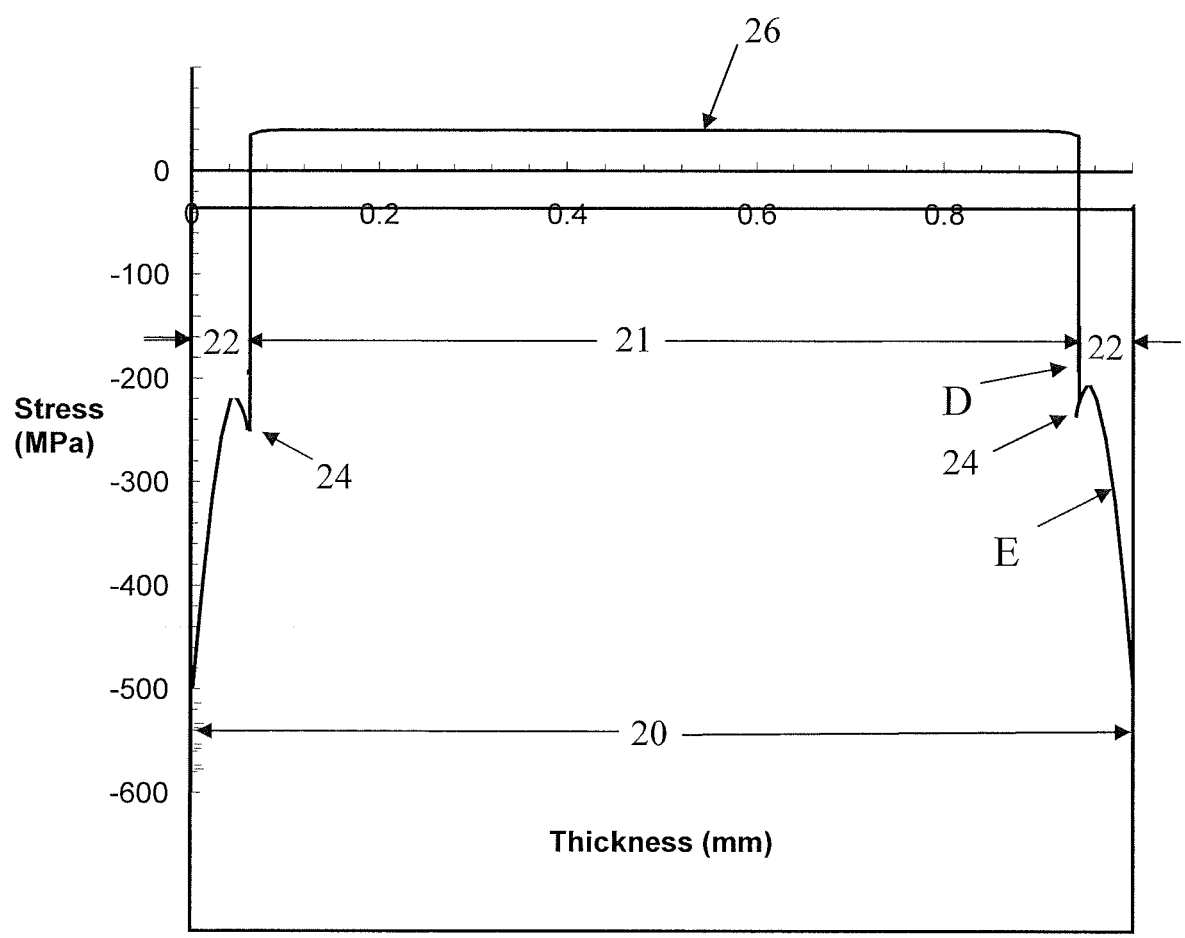
FIG. 4 is a plot illustrating the stress profile created in a glass laminate that has been strengthened using both a lamination strengthening process and an ion exchange strengthening process in accordance with further embodiments hereof.

FIG. 4 is a plot illustrating a stress profiles (line D) in a glass sheet 20, according to further embodiments hereof, in which the core glass may also be formed of an ion exchangeable glass. For example, the core glass may be a relatively a high CTE glass rich in high radius, mobile cations (such as K+ or Cs+), high-CTE ion-exchangeable glass. In certain embodiments where the core glass is a K-rich, high-CTE ion-exchangeable glass, when heat is applied to laminate the clad glass to the core glass the K+ ions in the core glass exchange with Na ions in the clad glass. There may be no additional or subsequent ion exchange heat treatment other than that which is required to laminate the clad glass to the core glass. Compressive stress is generated in the regions 24 of the clad glass layers 22 adjacent to the buried core glass/clad glass interface by the ion exchange between the core glass and the clad glass, e.g. Na↔K ion exchange. A buried layer of compressive stress 24 is thus formed in the inner surface region 24 of the clad glass, i.e. the region 24 of the clad glass adjacent to the interface between the clad glass and the core glass, as illustrated by the spike in line D in region 24 of the clad glass 22. When the laminate is allowed to cool following lamination, the clad glass layers 22 are place in a state of compressive stress and core glass layer 21 is placed in a state of tensile stress 26 due to their different CTEs. The compressive stress formed in the clad glass layers 22 by the ions exchanged from the core glass 21 combines with the compressive stress formed in the clad glass layers by the lamination of the clad glass layer with the core glass layer to produce the spike in the compressive stress.

The only heat applied to the laminate to achieve ion exchange between the core glass and the clad glass may be the heat applied during lamination of the clad glass layers to the core glass layer. Alternatively, an additional heat treatment may be performed following lamination to enhance the exchange of ions from the core glass to the clad glass. Such an additional heat treatment may simply be an extension the time during which the laminate is held at a lamination temperature beyond the amount of time required to laminate the clad glass to the core glass. The additional heat treatment may also be a heat treatment following lamination at a temperature that is lower then or higher than the lamination temperature.

In further embodiments hereof, such a laminate with a buried compressive stress layer 24 as described above is submerged in a molten salt bath, and compressive stress is generated in the outer near surface regions 18 of the clad glass via an ion exchange process that exchanges larger ions in the salt bath with smaller ions in the outer surface regions of the clad glass, as illustrated by line D in FIG. 4. The result is a glass laminate having enhanced compressive stress regions in the clad glass at both (a) the buried/inner regions 24 of the clad glass adjacent to or near the interface between the clad glass and the core glass and (b) the regions of the clad glass 22 adjacent to or near the outer surfaces of the clad glass as illustrated by the line E in FIG. 4 (e.g. near surface regions). Such a laminate has an increased compressive stress in the outer near surface regions and buried inner surface regions of the clad glass layer, as well as a deep depth of overall compressive stress 26 created by the lamination process as illustrated by line D-E in FIG. 4.

It has also been shown that buried regions or layers 14 of enhanced or relatively high compressive stress can cause crack deflection, i.e. turning a crack front 90° relative to its original propagation direction, and thereby stop harmful progression of the crack into the area of glass under tensile stress. A glass laminate having a buried region of enhanced compressive stress 14 may therefore have superior mechanical properties over traditional lamination strengthened laminates and ion exchanged chemically strengthened laminates that do not contain such a buried enhanced compressive stress layer. As previously discussed, when a fracture propagates through the outer regions of the glass or glass laminate that are under compressive stress and reaches the inner region 19 that is under tension a failure can occur causing the glass laminate to shatter. By deflecting or halting or deflecting the propagation of a fracture before it reaches the inner region of the laminate that is in tension, a buried region of enhanced compressive stress 14 may prevent or at least inhibit such a failure.

A core glass/clad glass pairing is chosen such that one or more of (1) there is sufficient CTE mismatch so as to generate substantial compressive stress in the clad glass layer upon cooling, (2) the clad glass is ion exchangeable in an external bath or with the core glass, and (3) the core glass contains ion exchangeable ions that are larger in ionic radius than ion exchangeable ions in the clad glass for ion exchange with the clad glass. Ion exchange between the core glass and the clad glass may be effected through one or more of (a) tailoring the cooling curve on the FDM, (b) a subsequent heat-treatment of the non-ion-exchanged glass, or (c) simultaneously during ion-exchange in an salt bath (ions moving between core glass and the clad glass and/or ions moving between the clad glass and the salt bath).

Embodiments of the present disclosure include a low-CTE, ion-exchangeable clad glass composition and a high-CTE core glass composition. The composition of the clad glass and the ion-exchange process may be designed to maximize the surface compression, e.g. compressive stress CS, at the expense of depth of compressive layer formed during the ion exchange process, since the depth of layer DOL is already provided by the CTE mismatch of the laminated sheet. Additionally, a high $K_2O$, high CTE core glass may be used, as discussed above, to create an additional buried layer 14 with enhanced compressive stress CS in front of the central layer that is in tension through the diffusion of K out of the core glass and into the clad glass. This may happen either on the draw (due to inter-diffusion between the laminate layers at the high isopipe temperature), during a subsequent heat treatment (allowing diffusion of the mobile ions such as Na+ and K+), or during a traditional ion-exchange step (which typically is performed at temperatures that are high enough to allow movement of the mobile ions). In this last case, a compressive layer will be generated in the clad glass layers 12 both at the outer surface regions 16 (from the ion exchange batch) as well as in the inner regions 14 near the clad glass/core glass interface.

Embodiments of the present disclosure include, by way of example only, compositions for the clad glass and the core glass that are suitable for fusion forming and lamination, and that are also suitable for chemical ion exchange strengthening. Certain embodiments of the present disclosure include a low-CTE, ion-exchangeable clad glass 12 compositions and a high-CTE core glass 11 compositions that are both capable of being fusion formed and ion exchangeable. The clad glass compositions may be designed to minimize thermal expansion and optimize the compressive stress created via the lamination process. Similarly, the lamination process may be designed to optimize the compressive stress created during the lamination process. The clad glass composition may also be designed to optimize the compressive stress and depth of layer created via the ion exchange process. For example, compressive stress via ion-exchange generally increases with increasing $Na_2O$. However, increasing $Na_2O$ content at the expense of most other glass constituents would increase thermal expansion and thereby lower the compressive stress due to the CTE mismatch from clad to core. Conversely, the addition of $B_2O_3$ helps to reduce thermal expansion, but also impedes ion-exchange. Creation of a clad glass as described herein requires balancing of these two effects through the manipulation of the various glass components. According to certain embodiments hereof, the clad glass contains moderate levels of $B_2O_3$, and lower $Na_2O$ concentrations than typical glasses designed exclusively for ion-exchange in order to balance a low CTE with acceptable ion-exchange performance. Similarly, the ion exchange bath and process may be designed to optimize the compressive stress and depth of layer created during the ion exchange process.

Figure 5:
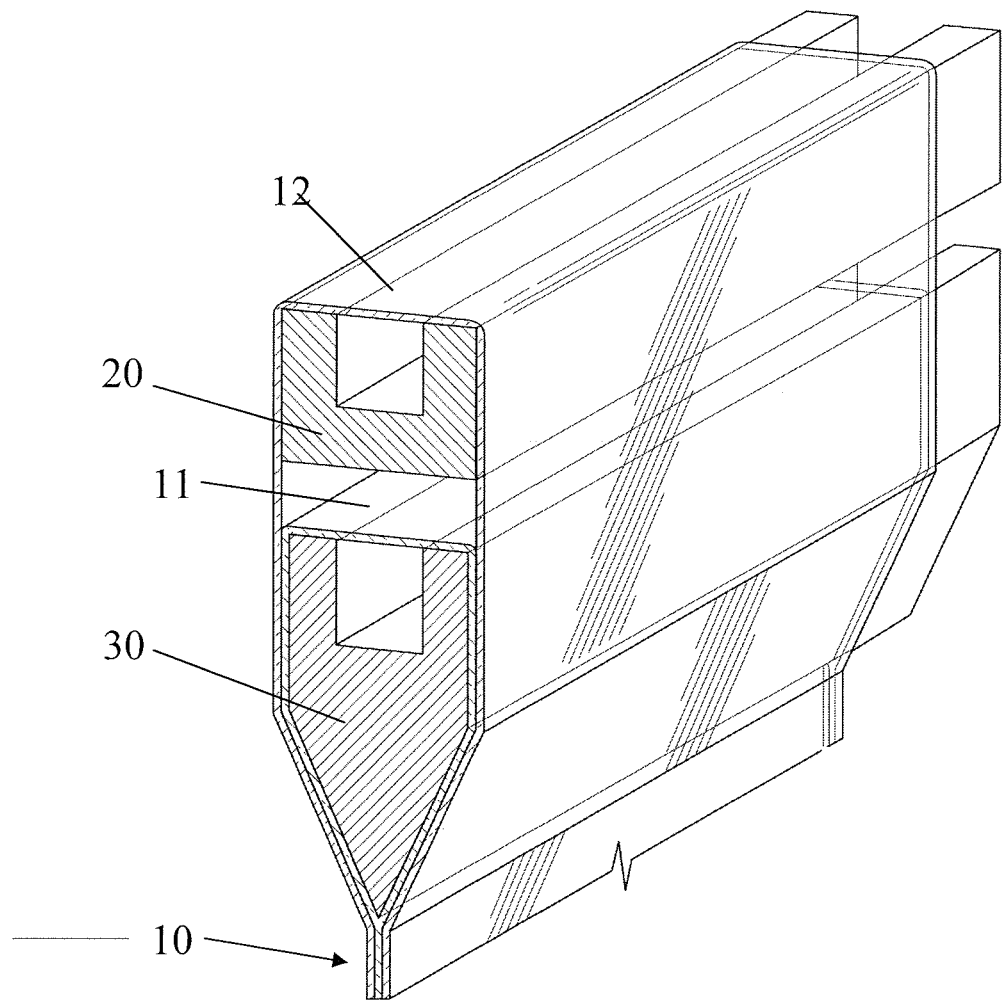
FIG. 5 is a schematic, cross-section, perspective view of an apparatus for glass fusion and lamination forming of a glass laminate in accordance with embodiments hereof.

Referring to Tables I, II and III, certain embodiments of the present disclosure include core glass compositions designed to have a sufficiently high CTE to strengthen the clad glass layer via lamination and cooling as described above, and optionally to be a significant source of $K_2O$ for interfacial ion-exchange as previously described in relation to FIG. 5. According to certain embodiments hereof, core glasses may contain minimal boron concentrations, and increased $K_2O.Al_2O_3$ content compared to typical glasses designed exclusively for ion-exchange. CTEs in a range from about $90\times10^{-7}/°$ C. to about $110\times10^{-7}/°$ C. are achievable.

Table I, II and III: Exemplary low CTE ion exchangeable clad glass compositions.

TABLE I

| (Mol %) | 1 | 2 | 3 | 4 | 5 | 6 | 7 | 8 | 9 | 10 |
|---|---|---|---|---|---|---|---|---|---|---|
| $SiO_2$ | 63.3 | 62.67 | 64.8 | 63.3 | 65.3 | 64.34 | 62.03 | 63.3 | 61.8 | 64.3 |
| $Al_2O_3$ | 11.4 | 11.29 | 10.94 | 11.4 | 11.4 | 11.59 | 11.17 | 11.4 | 12.15 | 11.58 |
| $B_2O_3$ | 9.2 | 9.11 | 8.82 | 9.2 | 7.2 | 7.7 | 9.02 | 9.2 | 9.2 | 9.34 |
| $P_2O_5$ | | | | | 0 | | | | | |
| MgO | 5.3 | 5.25 | 5.08 | 5.3 | 5.3 | 5.39 | 5.19 | 3.8 | 5.3 | 5.38 |
| CaO | 4.7 | 4.65 | 4.51 | 1.7 | 3.7 | 4.78 | 4.61 | 4.7 | 4.7 | 3.2 |
| BaO | 0 | 0 | 0 | 0 | 0 | 0 | 2 | 0 | 0 | 0 |
| ZnO | 0 | 0 | 0 | 0 | 0 | 0 | 0 | 0 | 0 | 0 |
| $Li_2O$ | 0 | 0 | 0 | 0 | 0 | 0 | 0 | 0 | 0 | 0 |
| $Na_2O$ | 4.2 | 4.16 | 4.03 | 7.2 | 6.2 | 4.27 | 4.12 | 5.7 | 4.95 | 4.27 |
| $K_2O$ | 1.8 | 1.78 | 1.73 | 1.8 | 0.8 | 1.83 | 1.76 | 1.8 | 1.8 | 1.83 |
| $SnO_2$ | 0.1 | 0.1 | 0.1 | 0.1 | 0.1 | 0.1 | 0.1 | 0.1 | 0.1 | 0.1 |
| $ZrO_2$ | 0 | 1 | 0 | 0 | 0 | 0 | 0 | 0 | 0 | 0 |
| Strain | 588 | 591 | 587 | 558 | 599 | 598 | 581 | 574 | 580 | 587 |
| Anneal | 639 | 644 | 639 | 608 | 649 | 650 | 624 | 623 | 631 | 640 |
| Softening | 879 | 874 | 882 | 852 | 890.8 | 888 | 835 | 860 | 862 | 888 |
| CTE | 50.7 | 50 | 49 | 60.5 | 52 | 50.9 | 57 | 55.2 | 53.7 | 48.7 |
| density | 2.395 | 2.422 | 2.387 | 2.379 | 2.403 | 2.405 | 2.447 | 2.395 | 2.404 | 2.377 |
| IX410-8 CS (31.8) | 315 | 412 | 306 | 517 | 446 | 316 | 316 | 412 | 364 | 318 |
| IX410-8 DOL (L) | 8 | 12 | 9 | 21 | 8 | 8 | 25 | 12 | 8 | 9 |

TABLE II

| (Mol %) | 11 | 12 | 13 | 14 | 15 | 16 | 17 | 18 | 19 | 20 | 21 |
|---|---|---|---|---|---|---|---|---|---|---|---|
| $SiO_2$ | 62.03 | 61.8 | 63.3 | 63.3 | 63.3 | 62.25 | 62.31 | 63.3 | 62.03 | 64.3 | 62.67 |
| $Al_2O_3$ | 11.17 | 11.87 | 11.4 | 11.4 | 11.4 | 11.21 | 11.22 | 11.4 | 11.17 | 11.4 | 11.29 |
| $B_2O_3$ | 9.02 | 9.58 | 9.2 | 9.2 | 9.2 | 10.7 | 9.06 | 9.2 | 9.02 | 8.2 | 9.11 |
| $P_2O_5$ | | | | 0 | | | | | | 0 | |
| MgO | 5.19 | 5.52 | 5.3 | 5.3 | 4.24 | 5.21 | 5.22 | 5.3 | 5.19 | 5.3 | 5.25 |
| CaO | 4.61 | 4.89 | 4.7 | 4.7 | 3.76 | 4.62 | 4.63 | 3.7 | 4.61 | 3.7 | 4.65 |
| BaO | 2 | 0 | 0 | 0 | 0 | 0 | 0 | 0 | 0 | 0 | 1 |
| ZnO | 0 | 0 | 0 | 0 | 0 | 0 | 0 | 0 | 0 | 0 | 0 |
| $Li_2O$ | 0 | 0 | 0 | 1 | 0 | 0 | 0 | 0 | 0 | 0 | 0 |
| $Na_2O$ | 4.12 | 4.37 | 5.2 | 3.2 | 6.93 | 4.13 | 5.7 | 6.2 | 4.12 | 6.2 | 4.16 |
| $K_2O$ | 1.76 | 1.87 | 0.8 | 1.8 | 1.07 | 1.77 | 1.77 | 0.8 | 1.76 | 0.8 | 1.78 |
| $SnO_2$ | 0.1 | 0.1 | 0.1 | 0.1 | 0.1 | 0.1 | 0.1 | 0.1 | 0.1 | 0.1 | 0.1 |
| $ZrO_2$ | 0 | 0 | 0 | 0 | 0 | 0 | 0 | 0 | 2 | 0 | 0 |
| Strain | 580 | 582 | 584 | 583 | 566 | 576 | 570 | 570 | 598 | 592 | 581 |
| Anneal | 628 | 632 | 635 | 630 | 613 | 626 | 618 | 612 | 650 | 642 | 624 |
| Softening | 821.8 | 862 | 867 | 861.7 | 840.5 | 856 | 843 | 822.4 | 878 | 877.9 | 841.1 |
| CTE | 54.8 | 51.6 | 49.1 | 48.4 | 57.8 | 51.2 | 56.4 | 59 | 48.8 | 51.4 | 57.7 |
| density | 2.503 | 2.404 | 2.397 | 2.4 | 2.397 | 2.385 | 2.413 | 2.404 | 2.453 | 2.399 | 2.41 |
| IX410-8 CS (31.8) | 645 | 325 | 361 | 370 | 561 | 308 | 418 | 453 | 323 | 436 | 304 |
| IX410-8 DOL (L) | 10 | 8 | 6 | 8 | 12 | 8 | 12 | 30 | 7 | 8 | 26 |

TABLE III

| (Mol %) | 22 | 23 | 24 | 25 | 26 | 27 | 28 | 29 | 30 | 31 | 32 | 33 |
|---|---|---|---|---|---|---|---|---|---|---|---|---|
| $SiO_2$ | 64.38 | 63.3 | 63.3 | 63.3 | 63.3 | 63.3 | 62.67 | 63.3 | 62.3 | 63.3 | 63.3 | 66.3 |
| $Al_2O_3$ | 9.9 | 11.4 | 11.4 | 11.4 | 11.4 | 11.4 | 11.29 | 11.4 | 11.22 | 11.4 | 11.4 | 11.4 |
| $B_2O_3$ | 9.36 | 9.2 | 9.2 | 9.2 | 9.2 | 9.2 | 9.11 | 9.2 | 9.06 | 9.2 | 9.2 | 6.2 |
| $P_2O_5$ | | | | | | 0 | | | | | 0 | 0 |
| MgO | 5.39 | 4.24 | 6.06 | 5.3 | 5.3 | 5.3 | 5.25 | 5.3 | 5.22 | 5.3 | 5.3 | 5.3 |
| CaO | 4.78 | 3.76 | 5.37 | 3.2 | 4.2 | 4.7 | 4.65 | 4.2 | 6.2 | 3.7 | 4.7 | 3.7 |
| BaO | 0 | 0 | 0 | 0 | 0 | 0 | 1 | 0 | 0 | 0 | 0 | 0 |
| ZnO | 0 | 0 | 0 | 0 | 0 | 0 | 0 | 0 | 0 | 0 | 0 | 0 |
| $Li_2O$ | 0 | 0 | 0 | 0 | 0 | 4.1 | 0 | 0 | 0 | 0 | 2.1 | 0 |
| $Na_2O$ | 4.27 | 6.9 | 3.96 | 5.7 | 5.2 | 0.1 | 4.16 | 5.2 | 4.13 | 6.2 | 2.1 | 6.2 |
| $K_2O$ | 1.83 | 1.07 | 0.61 | 1.8 | 1.3 | 1.8 | 1.78 | 1.3 | 1.77 | 0.8 | 1.8 | 0.8 |
| $SnO_2$ | 0.1 | 0.1 | 0.1 | 0.1 | 0.1 | 0.1 | 0.1 | 0.1 | 0.1 | 0.1 | 0.1 | 0.1 |
| $ZrO_2$ | 0 | 0 | 0 | 0 | 0 | 0 | 0 | 0 | 0 | 0 | 0 | 0 |
| Strain | 576 | 592 | 593 | 570 | 576 | 567 | 584 | 580 | 584 | 574 | 575 | 608 |
| Anneal | 625 | 635 | 637 | 621 | 619 | 612 | 631 | 628 | 633 | 624 | 622 | 659 |
| Softening | 860 | 800.6 | 853.2 | 862 | 843.1 | 831.2 | 850.5 | 859.3 | 860 | 849.4 | 848.9 | 906.2 |
| CTE | 52.4 | 63.4 | 53.6 | 53.4 | 59 | 45 | 51.8 | 51.9 | 52.3 | 52 | 46.4 | 51 |
| density | 2.39 | 2.406 | 2.444 | 2.388 | 2.397 | 2.396 | 2.447 | 2.399 | 2.414 | 2.394 | 2.399 | 2.403 |
| IX410-8 CS (31.8) | 317 | 489 | 318 | 412 | 379 | 357 | 396 | 476 | 269 | 529 | 369 | 440 |
| IX410-8 DOL (L) | 13 | 27 | 16 | 14 | 30 | 11 | 8 | 8 | 7 | 6 | 8 | 9 | where IX410-8 stands for ion exchanged at 410° C. for 8 hours; CS stands for compressive stress; and DOL stands for depth of layer.

Certain embodiments of the present disclosure include core glass compositions designed to have a sufficiently high CTE to strengthen the clad glass layer via lamination and cooling as described above, and optionally to be a significant source of $K_2O$ for interfacial ion-exchange as previously described in relation to FIG. 5. According to certain embodiments hereof, core glasses may contain minimal boron concentrations, and increased $K_2O.Al_2O_3$ content compared to typical glasses designed exclusively for ion-exchange.

The clad glass compositions described herein generally have relatively low coefficients of thermal expansion (CTEs) and, as such, may be utilized in conjunction with core glass compositions having relatively high CTEs to produce laminated glass articles which are compressively stressed without being ion-exchanged or thermally tempered. The clad glass compositions described herein are also amenable to further strengthening by ion-exchange to increase the surface compression in the glass. In one embodiment, a clad glass composition may include from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba and Zn. The clad glass composition generally has an average coefficient of thermal expansion which is less than or equal to 55×10$^{-7}$/° C. The glass compositions and laminated glass articles comprising the glass composition will be further described herein with specific reference to the appended drawings.

In the embodiments of the glass compositions described herein, the concentration of constituent components (e.g., $SiO_2$, $Al_2O_3$, $B_2O_3$ and the like) are specified in mole percent (mol. %) on an oxide basis, unless otherwise specified.

In embodiments of the ion exchangeable clad glass compositions (and the core glass composition if the core is to be ion exchangeable) described herein, $SiO_2$ may be the largest constituent of the composition and, as such, $SiO_2$ is the primary constituent of the glass network. When the concentration of $SiO_2$ in the glass composition is low (i.e., less than about 55 mol. %) the chemical durability of the resultant glass is low. In addition, the liquidus viscosity of the resultant glass may also be low rendering the glass unsuitable for fusion formation, such as with a fusion down draw process and/or a fusion lamination process. However, if the concentration of $SiO_2$ in the glass composition is too high (i.e., greater than about 70 mol. %), the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration greater than or equal to about 55 mol. % and less than or equal to about 70 mol. % in order to facilitate fusion forming the glass compositions. In some embodiments, the concentration of $SiO_2$ in the glass composition is greater than or equal to about 65 mol. % and less than or equal to about 70 mol. %. In still other embodiments, the amount of $SiO_2$ in the glass composition is greater than or equal to about 65 mol. % and less than or equal to about 68 mol. %. In some other embodiments, the glass composition comprises $SiO_2$ in a concentration from about 63 mol. % to about 66 mol. %.

The ion exchangeable glass compositions described herein also comprise $Al_2O_3$. $Al_2O_3$ serves as a glass network former, similar to $SiO_2$. Like $SiO_2$, $Al_2O_3$ increases the viscosity of the glass composition due to its primarily tetrahedral coordination in a glass melt formed from the glass composition. Further, an increase in the concentration of $Al_2O_3$ relative to alkali oxides or alkaline earth oxides in the glass composition generally decreases the CTE of the glass composition and increases the durability of the glass composition. $Al_2O_3$ also improves the ion-exchange performance of the glass composition by increasing the strain point of the glass and increasing the diffusivity of alkali ions in the glass network. Accordingly, the presence of $Al_2O_3$ improves the kinetics of the ion-exchange process and increases the maximum compressive stress which can be obtained. However, when the total concentration of alkali oxides in the glass composition is less than the concentration of $Al_2O_3$, the addition of $Al_2O_3$ can actually decrease the compressive stress and depth of layer that are achievable through ion-exchange.

In the embodiments of the ion exchangeable glass compositions described herein, the concentration of $Al_2O_3$ in the glass compositions is generally less than or equal to about 15 mol. % in order to achieve a glass composition having the desired low CTE and ion-exchange performance. For example, in some embodiments, the concentration of $Al_2O_3$ in the glass compositions is greater than or equal to about 9 mol. % and less than or equal to about 14 mol. %. In some embodiments, the concentration of $Al_2O_3$ in the glass compositions may be greater than or equal to about 10 mol. % and less than or equal to about 13 mol. %. In some other embodiments, the concentration of $Al_2O_3$ may be greater than or equal to about 10 mol. % and less than or equal to about 12 mol. %.

The ion exchangeable glass compositions described herein also include alkali oxide $R_2O$ where R is at least one of Li, Na, K or combinations thereof. In the embodiments described herein the alkali oxide lowers the melting temperature and the liquidus temperature of the glass, thereby improving the formability of the glass composition. However, relative to other oxides included in the glass, alkali oxides increase the CTE of the glass composition while simultaneously improving the ion-exchange performance. The CTE of the glass composition generally increases as the concentration of the alkali oxide increases. In general, the substitution of $K_2O$ for $Na_2O$ generally increases the CTE of the glass while the substitution of $Li_2O$ for $Na_2O$ decreases the CTE. Accordingly, the presence of smaller alkali ions in the glass causes a smaller increase in the CTE.

Specifically, ion-exchange is generally facilitated by the exchange of smaller alkali ions (such as $Li^+$ or $Na^+$) in the glass with larger alkali ions (such as $K^+$) in a molten salt bath. Three types of ion-exchange generally occur: $Na^+$ for $Li^+$ exchanges which yield a deep depth of layer but low compressive stress; $K^+$ for $Li^+$ exchanges which yield a small depth of layer but relatively large compressive stress; and $K^+$ for $Na^+$ exchanges which yield an intermediate depth of layer and intermediate compressive stresses. In the embodiments where the glass compositions are used as glass cladding layers in a fusion formed laminated glass article, the compressive stress is of primary interest as a high depth of layer may be obtained in the glass cladding layers through the lamination process. Accordingly, the alkali oxide in the glass compositions described herein will generally include greater concentrations of $Li_2O$ and $Na_2O$ than $K_2O$ in order to facilitate $K^+$ for $Li^+$ exchanges and/or $K^+$ for $Na^+$ exchanges to obtain maximum surface compression.

The ion-exchange performance of the glass compositions described herein is determined by ion-exchanging a glass article formed from the glass composition in a molten bath of $KNO_3$ at a temperature of 410° C. for 8 hours. Thereafter, the compressive stress and depth of layer are measured by optical birefringence. In the embodiments of the glass compositions described herein, the glass compositions generally have a compressive stress greater than 400 MPa following ion-exchange under the aforementioned conditions. In some embodiments, the compressive stress (CS) may be greater than or equal to about 450 MPa or even greater than or equal to about 500 MPa. In some embodiments the compressive stress may be greater than or equal to about 550 MPa. Further, the depth of layer (DOL) of the compressive stress is generally greater than or equal to about 5 μm or even greater than or equal to about 10 μm.

Further, the glass compositions described herein may have a liquidus viscosity suitable for fusion formation, such as by the fusion down-draw process and/or the fusion lamination process. In particular, the glass compositions described herein have a liquidus viscosity that is greater than or equal to about 35,000 Poise (35 kPoise). In some embodiments, the liquidus viscosity is greater than or equal to 50 kPoise or even greater than or equal to 100 kPoise.

Based on the foregoing, it should be understood that various embodiments of low CTE, ion-exchangeable glass compositions are disclosed herein. In a first exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a second exemplary embodiment, a glass composition includes from about 65 mol. % to about 68 mol. % $SiO_2$; from about 10 mol. % to about 13 mol. % $Al_2O_3$; and from about 6 mol. % to about 9 mol. % $B_2O_3$ as glass network formers. The glass composition may also include from about 6 mol. % to less than 9 mol. % alkali oxide $R_2O$, wherein R is at least one of Li, Na, and K. The glass composition may also include from about 7 mol. % to about 10 mol. % of divalent oxide MO, wherein M is at least one of Mg, Ca, Ba, and Zn. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a third exemplary embodiment, a glass composition includes from about 65 mol. % to about 70 mol. % $SiO_2$; from about 9 mol. % to about 14 mol. % $Al_2O_3$; and from about 0 mol. % to about 7 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a fourth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 9 mol. % of divalent oxide MO, wherein M is at least one of Mg, Ca, Ba, and Zn. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a fifth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein MO comprises MgO, and CaO and a concentration of MgO (mol. %) is greater than a concentration of CaO (mol. %). The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a sixth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein MO comprises MgO and CaO and a concentration of MgO is greater than 5 mol. % and a concentration of CaO is less than 5 mol. %. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a seventh exemplary embodiment, a glass composition includes from about 55 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. In this embodiment, the concentration of $B_2O_3$ may be less than about 7 mol. %. The concentration of the divalent oxide MO in this embodiment may be less than 9 mol. %. The divalent oxide MO may comprise both MgO and CaO and the concentration of the MgO (mol. %) may be greater than the concentration of CaO (mol. %), such as when the concentration of MgO is greater than about 5 mol. % and the concentration of CaO is less than 5 mol. %. The glass composition generally has an average coefficient of thermal expansion of a glass formed from the glass composition is less than or equal to $55 \times 10^{-7}$/° C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

While exemplary glass compositions have been described hereinabove with reference to specific compositional ranges for various constituent components (such as $SiO_2$, $Al_2O_3$, $B_2O_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

In one exemplary embodiment, the clad glass layer is formed from a glass composition having a low CTE, such as the glass compositions described hereinabove which include from about 65 mol. % to about 70 mol. % $SiO_2$; from about 9 mol. % to about 14 mol. % $Al_2O_3$; and from about 0 mol. % to about 11 mol. % $B_2O_3$ as glass network formers; from about 5 mol. % to less than 10 mol. % alkali oxide $R_2O$, wherein R is at least one of Li, Na, and K; from about 3 mol. % to about 11 mol. % of divalent oxide MO, wherein M is at least one of Mg, Ca, Ba, and Zn. These glass compositions generally have an average coefficient of thermal expansion which is less than or equal to $55 \times 10^{-7}$/° C. over the temperature range from about 20° C. to about 300° C. and are amenable to strengthening by ion-exchange. Due to the relatively low average coefficient of thermal expansion, the glass compositions are particularly well suited for use as the glass cladding layers of the laminated glass article.

In another exemplary embodiment, the clad glass layer may be formed from a glass composition with a low CTE, such as the glass compositions described hereinabove which include from about 65 mol. % to about 68 mol. % $SiO_2$; from about 10 mol. % to about 13 mol. % $Al_2O_3$; and from about 6 mol. % to about 9 mol. % $B_2O_3$ as glass network formers; from about 6 mol. % to less than 9 mol. % alkali oxide $R_2O$, wherein R is at least one of Li, Na, and K; and from about 7 mol. % to about 10 mol. % of divalent oxide MO, wherein M is at least one of Mg, Ca, Ba, and Zn. These glass compositions generally have an average coefficient of thermal expansion which is less than or equal to $55 \times 10^{-7}$/° C. over the temperature range from about 20° C. to about 300° C. and are amenable to strengthening by ion-exchange.

In another exemplary embodiment, the core glass layer may be formed from a glass composition comprising alkali ions that has a coefficient of thermal expansion greater than or equal to $75 \times 10^{-7}$/° C. in a temperature range from 20° C. to 800° C. For example, the core glass layer may be formed from a glass composition which comprises: from about 70 mol. % to about 80 mol. % $SiO_2$; from about 0 mol. % to about 8 mol. % $Al_2O_3$; from about 3 mol. % to about 10 mol. % $B_2O_3$; from about 0 mol. % to about 2 mol. % $Na_2O$; from about 10 mol. % to about 15 mol. % $K_2O$; and from about 5 mol. % to about 6 mol. % of alkaline earth oxide, wherein the alkaline earth oxide is at least one of CaO, SrO, and BaO without containing MgO. However, it should be understood that other glass compositions may also be used to form the glass core layer 102 of the laminated glass article 100, so long as the average coefficient of thermal expansion of the glass core layer 102 is greater than the average coefficient of thermal expansion of the glass cladding layers 104a, 104b.

While specific glass compositions for use as the clad glass and core glass layers 104a, 104b have been described herein, it should be understood that any of the glass compositions described herein may be used to form the glass cladding layers 104a, 104b of the laminated glass article 100 due to the relatively low CTE of the glass compositions.

According to various embodiments hereof, the glass laminate 10 may be formed using a fusion forming and laminating process. Fusion forming and laminating glass laminates in accordance with the teachings of the present disclosure can be conveniently illustrated with reference to the double isopipe fusion process illustrated schematically in FIG. 5, the details of which can be readily gleaned from available teachings in the art including, for example, Corning Incorporated U.S. Pat. Nos. 4,214,886, 7,207,193, 7,414,001, 7,430,880, 7,681,414, 7,685,840, 7,818,980, international publication WO 2004094321 A2, and PG Pub No. US 2009-0217705 A1, the contents of which are incorporated herein by reference. Molten outer or clad glass layer glass 12 overflows from an upper/clad isopipe 20 or other overflow pipe and molten inner or core glass layer glass overflows from a lower/core isopipe or overflow pipe 30 located directly below the upper isopipe 20. The clad glass 12 fuses to the core glass 11 on both sides of the lower isopipe 30. The two sides merge into a three-layer flat laminated glass sheet 10 comprising a core glass layer 11 and two outer layers 12 at the root of the lower isopipe 30. By employing a relatively high CTE core glass and a relatively low CTE clad glass according to the present description, a strengthened laminate having a stress profile as illustrated by line A in FIG. 1 is produced upon cooling of the glass sheet 10. The laminate sheet 10 may pass through several thermal zones for sheet shape and stress management and is then cut at the bottom of the draw into individual glass sheets. The individual glass sheets are subsequently ion exchanged, as described in further detail hereinafter, in order to obtain glass sheets 10 with a stress profile as illustrated by line C in FIG. 3 or line D in FIG. 4.

In other embodiments hereof the laminate is formed using a slot draw laminating process similar to the fusion draw process illustrated in FIG. 5. In such a slot draw process, the core glass may be emitted from a core glass feed slot and the clad glass is emitted from a pair of clad glass feed slots. In still other embodiments the glass sheets may be extruded and drawn. A combination of extrusion glass feeds, slot glass feeds or fusion glass feeds may also be employed.

It will be appreciated that the strengthened laminated glass sheet 10 as described herein may be a flat glass sheet, or it may be a 3 dimensional glass sheet having a simple or a complex curvature in one or more directions.

According to an embodiment hereof, a strengthen laminated solid cane of glass may be formed by feeding the core glass through an orifice to form a solid cylinder of core glass and feeding the clad glass through an annular orifice to form a hollow tube or cylinder of clad glass that is laminated to the outer surface of the core glass. In which case the inner diameter of the annular orifice may be equal to or slightly smaller than the outer diameter of the orifice. It will be appreciated that the core orifice and the clad orifice may be formed of shapes other than round or cylindrical to form glass canes having non-circular cross-sections to form various shaped tubes of glass.

According to a further embodiment hereof, the clad glass may be fed through first and second annular orifices such that first and second clad glass cylinders or tubes are formed and the core glass may be fed through a third annular orifice such that a core glass tube or cylinder is formed. In which case the inner diameter of the first orifice and the first clad glass tube may be equal to or slightly smaller than the outer diameter of the third orifice and the core glass tube, and the outer diameter of the second orifice and the second clad glass tube may be equal to or slightly larger than the inner diameter of the third orifice and the core glass tube. The first and second clad glass tubes are laminated to the outer peripheral surface and the inner peripheral surface, respectively, of the core glass tube, to form a tubular laminated and strengthened structure. The tubular laminated structure may then be ion exchanged. It will be appreciated that the annular orifices may be formed of shapes other than circles to form a non-circular tubular laminated glass structures.

In any of the preceding embodiments, the clad glass and the core glass may be laminated on the draw (extrusion, fusion or slot) or subsequently laminated in a separate lamination process. The core and clad glass sheets may also be formed using an updraw process, as well as a down draw process, or any other suitable process for forming an acceptable sheet of glass, such as a float glass or lost glass sheet forming process. The resulting laminated structure is then ion exchanged. Any combination of glass feed arrangement may be employed to feed the clad glass layers or sheets and the core glass layers or sheets.

The preceding embodiments describe and the accompanying Figures illustrate symmetrical three layer laminates including a core glass layer and two outer clad glass layers having the same composition, thickness, CS and DOL. However, the clad class layers may be of different compositions, SC, DOL and/or thickness, this forming an asymmetrical laminate. Additional glass layers may also be provided. For example, the laminate may be a seven layer laminate that includes two outer clad glass layers, a core glass layer and two intermediate glass interlayers located between the core and clad glass layers.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 µm up to at least 50 µm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. Provisional Patent Application No. 61/079,995, by Douglas C. Allan et al., entitled "Glass with Compressive Surface for Consumer Applications," filed Jul. 11, 2008, in which glass is strengthened by immersion in multiple, successive, ion exchange treatments in salt baths of different concentrations; and U.S. Provisional Patent Application No. 61/084,398, by Christopher M. Lee et al., entitled "Dual Stage Ion Exchange for Chemical Strengthening of Glass," filed Jul. 29, 2008, in which glass is strengthened by ion exchange in a first bath that is diluted with an effluent ion, followed by immersion in a second bath having a smaller concentration of the effluent ion than the first bath. The contents of U.S. Provisional Patent Application Nos. 61/079,995 and No. 61/084, 398 are incorporated herein by reference in their entirety.

Clad Glass Layer

The ion-exchange step can be optimized by selection of the ions to be exchanged, for example K+ for Na+ or Na+ for Li+, and by selection of ion-exchange parameters, such as temperature and time schedule, based on compositions and thicknesses of core and clad glasses. It may be desirable that both core and clad glasses be ion-exchangeable, especially for laminates with relatively thin skin. The secondary process involving ion-exchange affords tailorability of final values of surface compression and depth of layer. Indeed, it widens the design window for final product by way of surface compression, stress profile, depth of layer and center tension.

It should now be understood that the glass compositions described herein have relatively low coefficients of thermal expansion. As such, the glass compositions described herein are particularly well suited for use in conjunction with glass compositions with relatively high coefficients of thermal expansion to form a compressively stressed laminated glass article by the fusion laminate process.

Moreover, the glass compositions described herein are amenable to strengthening by ion-exchange. As such, the strength of the laminated glass articles which utilize the glass compositions described herein as glass cladding layers may be further improved by ion-exchanging the glass articles following lamination. Such glass articles may be particularly well suited for use as cover glasses for touch screen displays, mobile electronic devices and the like.

Strengthened glass articles (such as glass article 10, shown in FIG. 2) can be used as a protective cover plate (as used herein, the term "cover plate" includes windows or the like) for display and touch screen applications, such as, but not limited to, portable communication and entertainment devices such as mobile telephones, music players, video players, or the like; and as a display screen for information-related terminal (IT) (e.g., portable, tablet or laptop computers) devices; LCD and LED displays; as well as in other applications.

The technical advantages of such laminates according to embodiments hereof may include increased retained-strength after damage (measured by abraded ROR) as compared with an ion-exchanged glass (non-laminated) at the same thickness; increased surface strength (measured by non-abraded, as-formed ROR) as compared with non-ion-exchanged, laminated glass at the same thickness; and the deflection of cracks and increased fracture toughness exhibited by samples of the laminate with buried stress maxima.

Since the lamination process already creates a compressive stress on the clad glass, the degree of ion exchange may be significantly less for a laminate as described herein compared to an ion exchange only strengthened glass sheet. The cost of the ion exchange process can thus be reduced compared to an ion exchange only strengthened glass sheet, Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A strengthened laminated glass structure comprising:
a core glass layer having a first coefficient of thermal expansion (CTE);
a first clad glass layer laminated to a first surface of the core glass layer; and
a second clad glass layer laminated to a second surface of the core glass layer;
wherein each of the first clad glass layer and the second clad glass layer comprises an ion exchangeable glass having a second CTE that is lower than the first CTE of the core glass layer, whereby each of the first clad glass layer and the second clad glass layer is in a state of compressive stress; and
wherein a buried compressive stress region of each of the first clad glass layer and the second clad glass layer is in a state of enhanced compressive stress compared to a non-ion-exchanged region of the respective first clad glass layer or second clad glass layer.

2. The strengthened laminated glass structure of claim 1, wherein the ion exchangeable glass of each of the first clad glass layer and the second clad glass layer is an alkali aluminosilicate glass.

3. The strengthened laminated glass structure of claim 1, wherein the buried compressive stress region of each of the first clad glass layer and the second clad glass layer is disposed adjacent an interface between the core glass layer and the respective first clad glass layer or second clad glass layer.

4. The strengthened laminated glass structure of claim 1, wherein the buried compressive stress region of each of the first clad glass layer and the second clad glass layer is a result of ion exchange between the core glass layer and the respective first clad glass layer or second clad glass layer.

5. The strengthened laminated glass structure of claim 1, wherein the core layer comprises an ion exchangeable glass.

6. The strengthened laminated glass structure of claim 5, wherein the ion exchangeable glass of the core glass layer has a greater concentration of K ions than the ion exchangeable glass of each of the first clad glass layer and the second clad glass layer.

7. The strengthened laminated glass structure of claim 1, wherein compressive stress produced by ions exchanged from the core glass layer into each of the first clad glass layer and the second clad glass layer combine with the state of compressive stress in the respective first clad glass layer or second clad glass layer to produce a spike in compressive stress in the buried compressive stress region of the respective first clad glass layer or second clad glass layer.

8. The strengthened laminated glass structure of claim 1, wherein the second CTE of the ion exchangeable glass of each of the first clad glass layer and the second clad glass layer is less than or equal to $65 \times 10^{-7}/°C$.

9. The strengthened laminated glass structure of claim 1, wherein an ion exchanged outer surface region of each of the first clad glass layer and the second clad glass layer is in a state of enhanced compressive stress compared to a non-ion-exchanged outer surface region of the respective first clad glass layer or second clad glass layer.

10. The strengthened laminated glass structure of claim 1, wherein the second CTE is at least $10 \times 10^{-7}/°$ C. lower than the first CTE.

11. The strengthened laminated glass structure of claim 1, wherein the second CTE is lower than the first CTE by an amount in a range from $10 \times 10^{-7}/°$ C. to $60 \times 10^{-7}/°$ C.

12. The strengthened laminated glass structure of claim 1, wherein the second CTE is lower than the first CTE by an amount in a range from $10 \times 10^{-7}/°$ C. to $50 \times 10^{-7}/°$ C.

13. The strengthened laminated glass structure of claim 1, wherein:
   the core glass layer comprises a hollow core glass tube, the first surface of the core glass layer is an inner peripheral surface of the hollow core glass tube, and the second surface of the core glass layer is an outer peripheral surface of the hollow core glass tube;
   the first clad glass layer comprises a first hollow clad glass tube laminated to the outer peripheral surface of the core glass tube; and
   the second clad glass layer comprises a second hollow clad glass tube laminated to the inner peripheral surface of the core glass tube.

14. The strengthened laminated glass structure of claim 1, wherein the ion exchangeable glass comprises:
   about 65 mol. % to about 70 mol. % $SiO_2$;
   about 9 mol. % to about 14 mol. % $Al_2O_3$;
   about 0 mol. % to about 11 mol. % $B_2O_3$;
   about 5 mol. % to less than 10 mol. % alkali oxide $R_2O$, wherein R is at least one of Li, Na, or K; and
   about 3 mol. % to about 11 mol. % divalent oxide MO, wherein M is at least one of Mg, Ca, Ba or Zn.

15. A strengthened laminated glass structure comprising:
   a core glass layer with a first coefficient of thermal expansion (CTE);
   a first clad glass layer laminated to a first surface of the core glass layer; and
   a second clad glass layer laminated to a second surface of the core glass layer;
   wherein each of the first clad glass layer and the second clad glass layer comprises an ion exchangeable glass with a second CTE that is lower than the first CTE of the core glass layer, whereby each of the first clad glass layer and the second clad glass layer is in a state of compressive stress; and
   wherein an inner surface region of each of the first clad glass layer and the second clad glass layer is in a state of enhanced compressive stress, compared to a non-ion-exchanged region of the respective first clad glass layer or second clad glass layer, resulting from an exchange of high radius ions in the core glass layer with smaller ions in each of the first clad glass layer and the second clad glass layer.

16. The strengthened laminated glass structure of claim 15, wherein an ion exchanged outer surface region of each of the first clad glass layer and the second clad glass layer is in a state of enhanced compressive stress compared to a non-ion-exchanged outer surface region of the respective first clad glass layer or second clad glass layer.

* * * * *